Aug. 25, 1964    J. ELLARD ETAL    3,145,810
RIBBED PANEL ASSEMBLY
Filed May 11, 1960    3 Sheets-Sheet 1

FREDERICK N. RUSHTON
RAYMOND G. TARRANT
JACK ELLARD
INVENTORS

BY Walter G. Finch
ATTORNEY

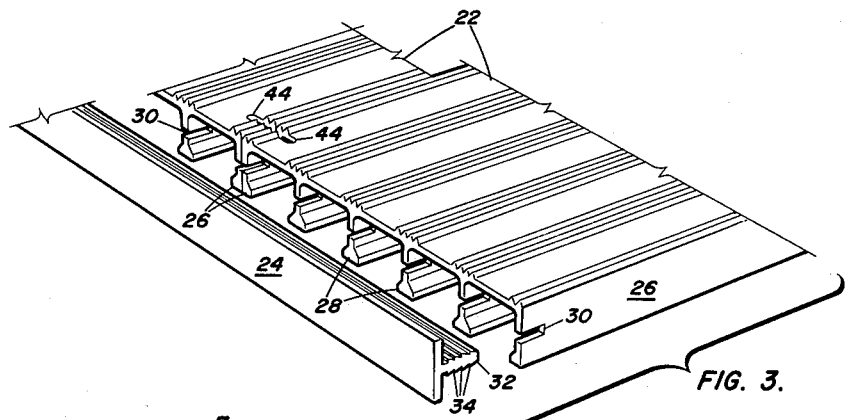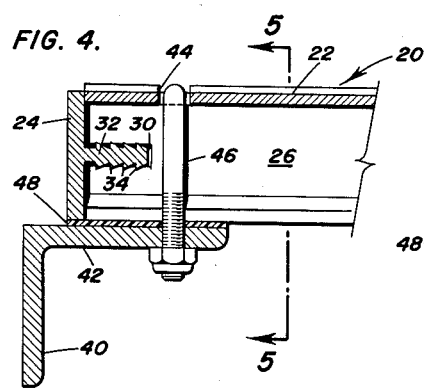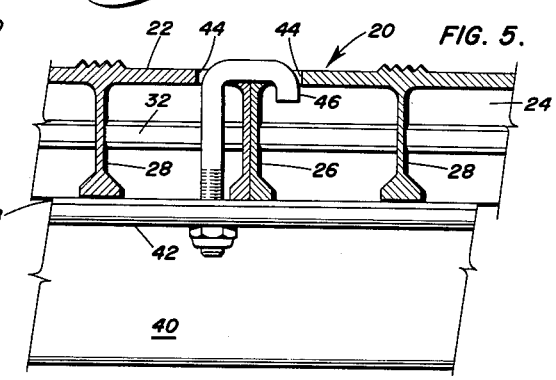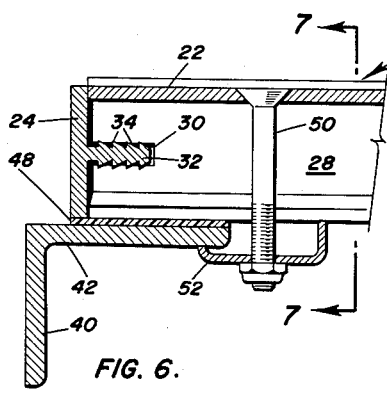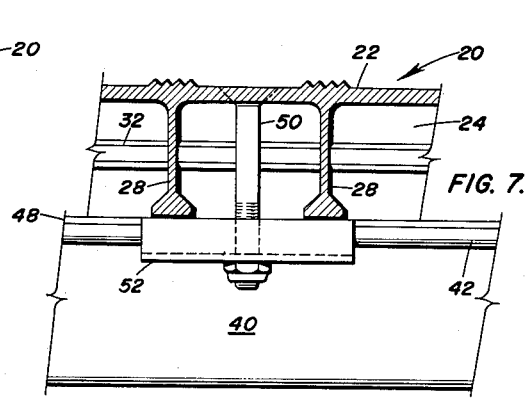

FREDERICK N. RUSHTON
RAYMOND G. TARRANT
JACK ELLARD
          INVENTORS

BY Walter G. Finch
          ATTORNEY

United States Patent Office 3,145,810
Patented Aug. 25, 1964

3,145,810
RIBBED PANEL ASSEMBLY
Jack Ellard, Baltimore, Raymond G. Tarrant, West Friendship, and Frederick N. Rushton, Baltimore, Md., assignors to Washington Aluminum Company, Inc., Baltimore, Md., a corporation of Maryland
Filed May 11, 1960, Ser. No. 28,327
2 Claims. (Cl. 189—34)

This invention relates generally to connectors or splices, and more particularly it pertains to means for securing together and supporting components of metallic platforms.

In the erection of platforms, particularly those having gratings or treadplates of extruded structural cross section, the erector is faced with the problem of suitably anchoring the adjacent sections together. At the same time, in the case of relatively thin longitudinally webbed or ribbed plates it is necessary to provide transverse support. Usually all contacting parts are welded together to avoid vibration noise.

It is, therefore, an object of the present invention to provide a trim bar for improving the appearance, supplementing the strength of webbed platform gratings, and securing them together into a unitary structure.

Another object of this invention is to provide a frame for a grating platform which binds the grating webs by their ends.

And still another object of this invention is to provide a novel support beam which locks itself to spaced elements of a supported grating.

And yet another object of this invention is to provide a platform assembly of light weight, self-jigging construction which can be readily assembled with a minimum of hardware and welding of parts.

These and other objects and attendant advantages of this invention will become more readily apparent and understood from the accompanying specification and drawings in which:

FIG. 3 is a fragmentary exploded perspective of the major components of a grating assembly;

FIG. 4 is a detail cross section taken on line 4—4 of FIG. 1, illustrating an interlocking binding bar for securing a grating assembly to a supporting structure;

FIG. 5 is a cross section taken along line 5—5 of FIG. 4;

FIG. 6 is a detail cross section similar to FIG. 4 but illustrating a further means for securing a grating to supporting structure;

FIG. 7 is a cross section taken along line 7—7 of FIG. 6;

Figure 1:
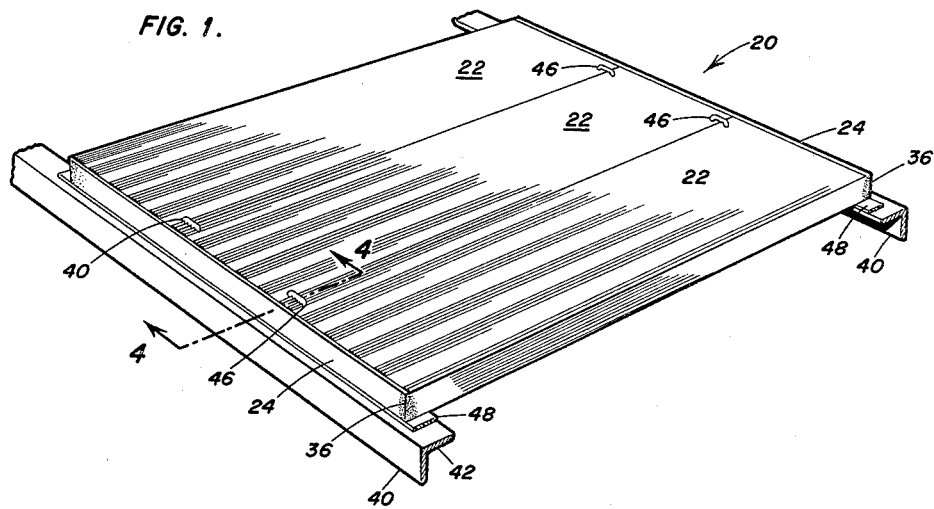
FIG. 1 is a top perspective view of a grating assembly mounted upon a pair of supporting structural members.

Referring now to the details of the drawings in FIG. 1, there is shown generally by reference numeral 20, a grating assembly embodying features of this invention. The grating assembly 20 is made up of a plurality of extruded panels 22 placed side-by-side.

As shown in FIG. 3, each of the panels 22 is cast or extruded with depending side legs 26, and intermediate legs 28 which extend from end to end thereof. The ends of these legs 26 and 28 are machined on a common center line to provide each with a slot 30.

Figure 2:
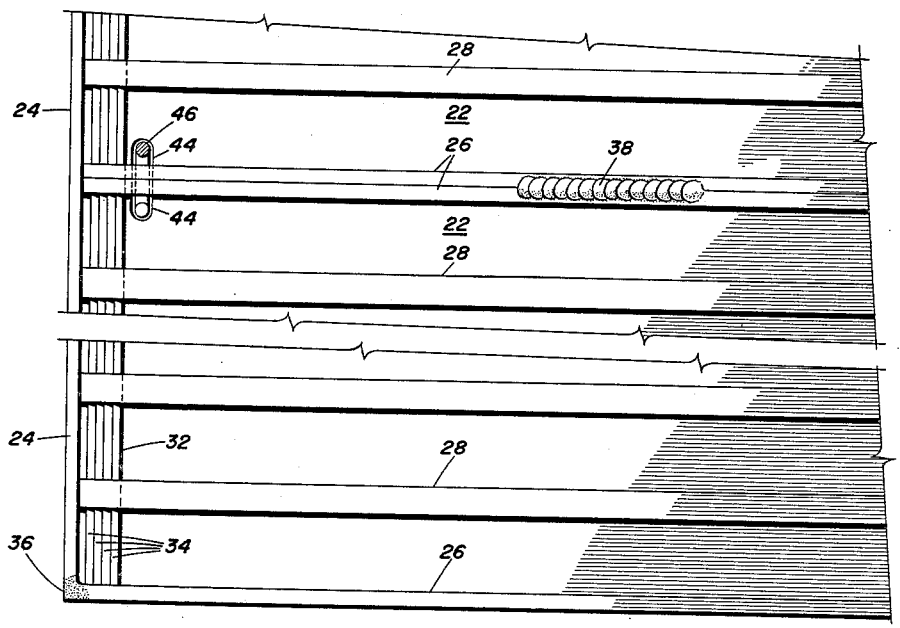
FIG. 2 is a fragmentary bottom plan of one corner of the grating assembly of FIG. 1.

A pair of end binding bars 24 are provided for trimming and supporting the ends of the group of panels 22. These end binding bars 24 are of substantially T-shaped cross section, with each having a serrated tang 32 and with ratchet-tooth shaped serrations 34 running lengthwise on both sides thereof. The binding bar 24 is secured to the panels 22 by pressing the serrated tang 32 into the slots where it is held in frictional weld engagement by the bite of the serrations 34 as shown in FIGS. 1 and 2.

Where lengthy panels 22 are being assembled, it is desirable to provide occasional welds 38 to secure the adjacent side legs 26 together intermediate their ends. A small corner weld 36, ground flush, is otherwise the extent of the welding required to form a neat strong grating assembly 20.

The grating assembly 20 may be secured to a structural member 40 as shown in FIGS. 1, 2, 4, and 5 by means of a J-bolt and nuts 46. For this purpose, corner notches 44 are provided in the panels 22. It will be noted that the notches 44 of adjacent panels 22 together essentially provide a recess into which the curved portion of the inverted J-bolt 46 fits and rests on the pair of side legs 26. The depending threaded shank of the J-bolt 46 is then secured to the horizontal web 42 of the member 40 with an optional intervening micarta insulating strip 48, if desired.

FIGS. 6 and 7 illustrate the use of a clip 52 and a flathead bolt and nut 50 for securing the grating assembly 20 to the structural member 40 for quick removal thereof. In this case, the bolt 50 need only be loosened and the clip 52 swing away from engagement with the horizontal web 42.

Figure 9:
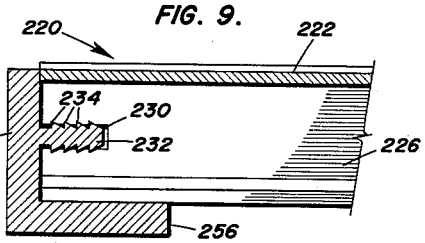
FIG. 9 is a fragmentary detail cross section taken through a grating assembly showing a third modified interlocking binding bar therefor.

FIG. 9 depicts an arrangement which gives greater support to the platform as a whole. Reference numerals 222 and 226 refer to an extruded panel and its legs, respectively. The supporting and binding angle 224, in this instance, is provided with a base web 256 in the manner of structural L pieces. A tang 232, with serrations 234, is employed as in the previous example of FIGS. 1 to 7 to engage with slots 230 which is cut in each leg 226 of the grating. Therefore, in addition to obtaining a binding effect, the modified panel assembly 220 gains added strength from the support provided by the web 256 beneath the legs 226.

Figure 8:
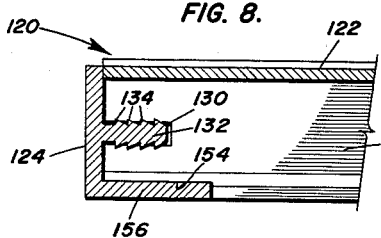
FIG. 8 is a fragmentary detail cross section taken through a grating assembly showing another modified interlocking binding bar therefor.

There are instances where the bottom of the grating assembly is desired to be flush such as in the case of removable grilles. In a modified embodiment of the invention, a grating assembly 120 is shown in FIG. 8. A web supporting notch 154 is milled across the legs 126 of the extruded panel 122. A flush binding angle 124 having a base web 156 and a tang 132 with serrations 134 corresponds in all respects to the previously described supporting and binding angle 224 and respective components 256, 232 and 234 thereof. When the angle 124 is applied to the ends of the legs 226, the slot 130 receives the tang 132 while the notch 154 receives the base web 156 flush with the bottom of the assembly 120.

Figure 10:
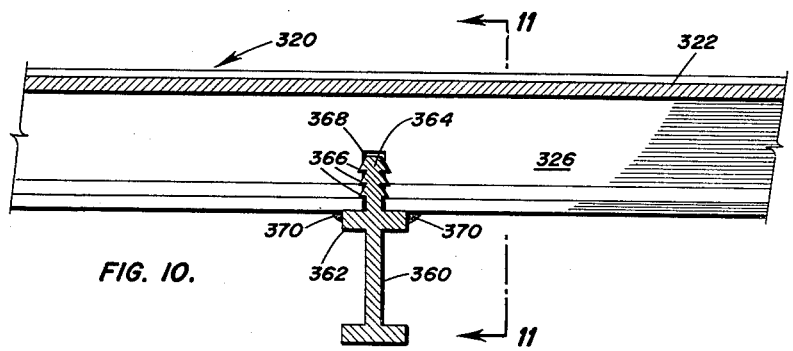
FIG. 10 is a fragmentary detail cross section taken through a grating assembly illustrating a fourth modified interlocking binding bar therefor.
Figure 11:
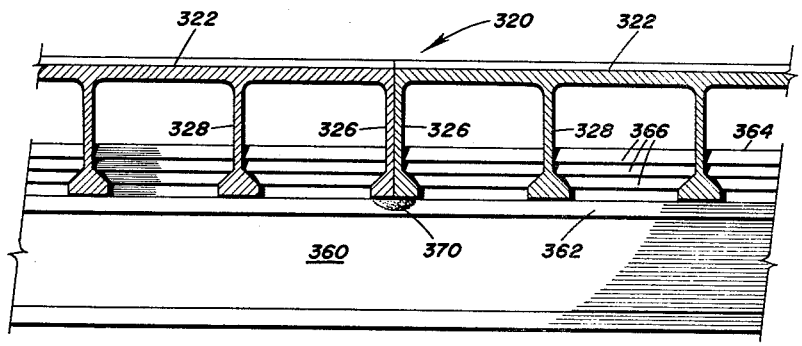
FIG. 11 is a cross section taken along line 11—11 of FIG. 10.

FIGS. 10 and 11 illustrate a supporting and binding I-beam 360 which embodies features of this invention. Where there is required a long grating assembly, such as the one designated by reference numeral 320, a support member is required intermediate the ends. It is additionally desired that the side legs 326 of adjacent extruded panels 322 be held in tight proximity. The supporting and binding I-beam 360 is provided with a longitudinal tang 364 centered on its top or supporting upper flange 362. A tang receiving slot 368 is cut successively in line across all of the side legs 326 and intermediate legs 328 of the panels 322. These slotted panels 322 are then placed side-by-side across the supporting and binding I-beam 360 and forced downwardly upon the tang 364. The tang 364 is made with sharp serrations 366 on opposite sides thereof and they frictionally engage and cold-weld within the slots 368 to provide a permanent assembly, it is only necessary to make small tack welds 370 at the junction of the side legs 326 and the upper flange 362. If desired, a plurality of spaced I-beams 360 can be used for supporting the grating assemblies and all arranged as described above.

Obviously many modifications and variations of the present invention are possible in light of the above teachings. It is, therefore, to be understood that within the scope of the appended claims the invention may be practiced otherwise than as specifically described.

What is claimed is:

1. In combination, support structure and at least one grating assembly secured thereto, said grating assembly comprising a plurality of panels placed side-by-side, each said panel having a top portion and side legs and intermediately spaced legs therebetween depending downwardly therefrom on one side and running lengthwise thereof, said legs each having a slot provided at each end thereof and spaced from said top portion along a common line at the respective opposite ends of said legs, and means uniting said plurality of panels into said grating assembly, said means including a pair of end binding members supporting said opposite ends of said legs and each having a serrated rib portion engaging the surfaces of each slot of said legs of said panels in frictional weld fashion thereby holding said panels in side-by-side relationship and weld means joining the ends of said pair of binding members to the side legs of said plurality of panels at the corners of said grating assembly and said panels to each other at spaced points, each panel of said grating assembly having at least one aperture in the top portion thereof transverse a side leg thereof and aligned with a like aperture in an adjacent panel to form a slot, and means securing said grating assembly to said support structure including a J-bolt having its hook portion positioned in said slot and overlying adjacent side legs of adjacent panels of said grating assembly and its threaded portion in clampable engagement with said support structure, whereby said J-bolt clamps both panels of said adjacent panels to said support structure.

2. In combination, support structure and at least one grating assembly secured thereto, said grating assembly comprising a plurality of panels placed side-by-side, each said panel having a top portion and side legs and intermediately spaced legs therebetween depending downwardly therefrom on one side and running lengthwise thereof, said legs each having a slot provided at each end thereof and spaced from said top portion along a common line at the respective opposite ends of said legs, and means uniting said plurality of panels into said grating assembly, said means including a pair of end binding members supporting said opposite ends of said legs and each having a serrated rib portion engaging the surfaces of each slot of said legs of said panels in frictional weld fashion thereby holding said panels in side-by-side relationship and weld means joining said pair of binding members to said plurality of panels and said panels to each other, each panel of said grating assembly having at least one aperture in the top portion thereof transverse a side leg thereof and aligned with a like aperture in an adjacent panel to form a slot, and means securing said grating assembly to said support structure including a J-bolt having its hook portion positioned in said slot and overlying adjacent side legs of adjacent panels of said grating assembly and its threaded portion in clampable engagement with said support structure, whereby said J-bolt clamps both panels of said adjacent panels to said support structure.

References Cited in the file of this patent

UNITED STATES PATENTS

| | | |
|---|---|---|
| 1,483,095 | Kain | Feb. 12, 1924 |
| 2,380,287 | Baumbach | July 10, 1945 |
| 2,490,594 | Madden | Dec. 6, 1949 |
| 2,742,121 | Liskey | Apr. 17, 1956 |
| 2,797,447 | Winer | July 2, 1957 |
| 2,852,815 | Sale | Sept. 23, 1958 |
| 2,956,653 | Liskey | Oct. 18, 1960 |
| 3,017,673 | Biris | Jan. 23, 1962 |
| 3,046,852 | Graham | July 31, 1962 |

FOREIGN PATENTS

| | | |
|---|---|---|
| 202,340 | Buchler | July 5, 1956 |